(12) United States Patent
Wang et al.

(10) Patent No.: US 7,884,992 B1
(45) Date of Patent: Feb. 8, 2011

(54) PHOTOCHROMIC OPTICAL ARTICLE

(75) Inventors: Yun-Cheng Wang, Yuanli (TW);
Yi-Tang Wang, Yonghe (TW)

(73) Assignee: Darwin Optical Co., Ltd., Taichung (TW)

( * ) Notice: Subject to any disclaimer, the term of this patent is extended or adjusted under 35 U.S.C. 154(b) by 0 days.

(21) Appl. No.: 12/541,089

(22) Filed: Aug. 13, 2009

(51) Int. Cl.
*G02F 1/03* (2006.01)
*G02F 1/13* (2006.01)
*G02B 5/30* (2006.01)
*G02C 5/00* (2006.01)

(52) U.S. Cl. .................. 359/241; 359/489; 351/41; 349/13

(58) Field of Classification Search .................. 359/241, 359/237, 242, 244–245, 270–273, 485, 488–489, 359/493; 351/41, 44, 49, 163; 349/13
See application file for complete search history.

(56) References Cited

U.S. PATENT DOCUMENTS

| 2005/0026072 A1* | 2/2005 | Srinivasa | 430/270.1 |
| 2005/0136260 A1* | 6/2005 | Garcia | 428/411.1 |
| 2006/0222973 A1* | 10/2006 | Iftime et al. | 430/19 |

* cited by examiner

*Primary Examiner*—Scott J Sugarman
*Assistant Examiner*—Dawayne A Pinkney
(74) *Attorney, Agent, or Firm*—Townsend and Townsend and Crew, LLP

(57) ABSTRACT

A photochromic optical article comprises a substrate, and a photochromic coating coated on an outer surface of the substrate and having at least two photochromic layers. Each of the photochromic layers has a composition that contains a carrier and at least one photochromic dye. The compositions of the photochromic layers are different from each other.

4 Claims, 5 Drawing Sheets

PHOTOCHROMIC OPTICAL ARTICLE

BACKGROUND OF THE INVENTION

1. Field of the Invention

This invention relates to an optical article, more particularly to a photochromic optical article.

2. Description of the Related Art

A carrier containing a photochromic dye(s) can undergo change in color when exposed to light radiation, such as UV radiation or sunlight, and returns to its original color when removed from the light radiation. This phenomenon is known as a photochromic effect. In general, the same photochromic dye(s) present in different carriers will produce different colors, different activated intensities, different color activating and fading rates, etc. Further, different carriers have different capacities for mixing with the same photochromic dye (s) so that a dye-to-carrier weight ratio varies for different carriers and the same photochromic dye(s). Methods of providing a photochromic effect in the prior art have the following characteristics and drawbacks:

1. In one conventional method, a photochromic dye(s) is directly mixed with a material of a target body, such as an eyeglass lens, so that the target body contains the photochromic dye(s). Commonly used materials for the eyeglass lens are allyl diglycol carbonate (CR-39), polycarbonate, and other polymeric materials with high refractive indices. A disadvantage of this method is that it is unable to be used where the material of the target body is not suitable for use as a carrier for the photochromic dye(s). Even if the material of the target body can be a photochromic dye carrier, it may not be the best carrier to allow particular photochromatic dye(s) to achieve sufficiently fast rates of color change and color fading, a sufficient darkness, or satisfactory color.

2. In another conventional method, a suitable polymer, such as cellulose acetate butyrate, is selected as a carrier, and a photochromic dye(s) is added to the selected polymer to make a laminate. The laminate is then adhered to a polycarbonate lens to form a photochromic lens. Although such a technique can resolve the drawback of the aforementioned method that involves directly mixing photochromic dye(s) with a target body, the steps involved therein are complicated so that a high manufacturing cost and a high defect rate result.

3. To resolve the aforesaid drawbacks, the use of a coating process to form a photochromic layer on a surface of a lens is developed. Aside from allowing selection of a good carrier for the photochromic dye(s), use of the techniques disclosed in these patents is such that the manufacturing process is simplified, and the manufacturing cost is minimized. However, while the original color prior to color change and the resulting color after color change are important factors that determine whether a photochromic article is acceptable or not in the market, a single photochromic dye, as is used in these patents, cannot ensure that such color transformation characteristics will be achieved.

4. Referring to FIG. 1, a photochromic article 9 includes two different photochromic dyes (A, B). A polymeric material is first selected as a carrier (X), after which a photochromic dye (A) and a photochromic dye (B) are mixed with the polymer or prepolymer carrier (X). The carrier (X) is then coated on a substrate 91 by a coating process. After curing, a single photochromic layer 92 is formed on the substrate 91. Since a photochromic dye demonstrates different photochromic properties in different carriers, the photochromic dyes (A, B) in the photochromic layer 92 may therefore demonstrate different photochromic properties after mixing with the carrier (X). Hence, the carrier (X) cannot be a suitable carrier for both of the photochromic dyes (A) and (B).

5. Referring to FIG. 2, a conventional method to increase the activated color intensity of the photochromic article 9 involves increasing the thickness of the photochromic layer 92 or increasing a weight ratio of photochromic dye to carrier. However, a coating process cannot produce a very thick coating layer. Further, if the coating layer is very thick, it easily shrinks during a curing process so that the coating layer will be uneven or produces an internal stress. Moreover, the weight ratio of photochromic dye to carrier can be increased only within a limited range. If the weight ratio of photochromic dye to carrier is excessively large, not only is it not possible to intensify the color, any color change at all may be rendered difficult.

SUMMARY OF THE INVENTION

Therefore, the object of the present invention is to provide a photochromic optical article with enhanced photochromic properties.

According to this invention, a photochromic optical article comprises a substrate, and a photochromic coating coated on an outer surface of the substrate and having at least two photochromic layers. Each of the photochromic layers has a composition that contains a carrier and at least one photochromic dye. The compositions of the photochromic layers are different from each other.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
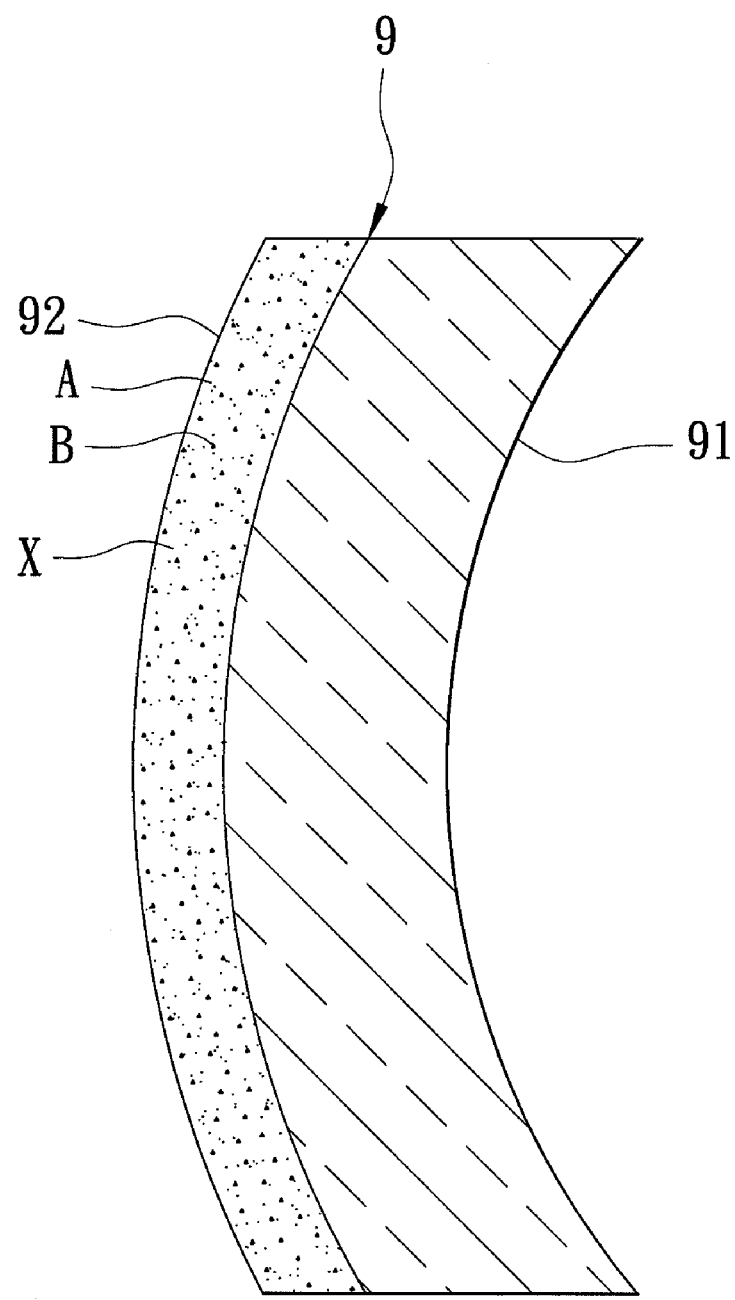
FIG. 1 is a sectional view of a conventional photochromic optical article.

Before the present invention is described in greater detail, it should be noted that the same reference numerals have been used to denote like elements throughout the specification.

The photochromic optical article of the present invention may be a lens (such as an eyeglass lens), a screen, a window, a protective plate, etc., and may be an element having a special function, such as a photochromic film/coating, a polarized lens, or a colored lens. The photochromic optical article of the present invention is not limited to the aforesaid disclosure.

Figure 3:
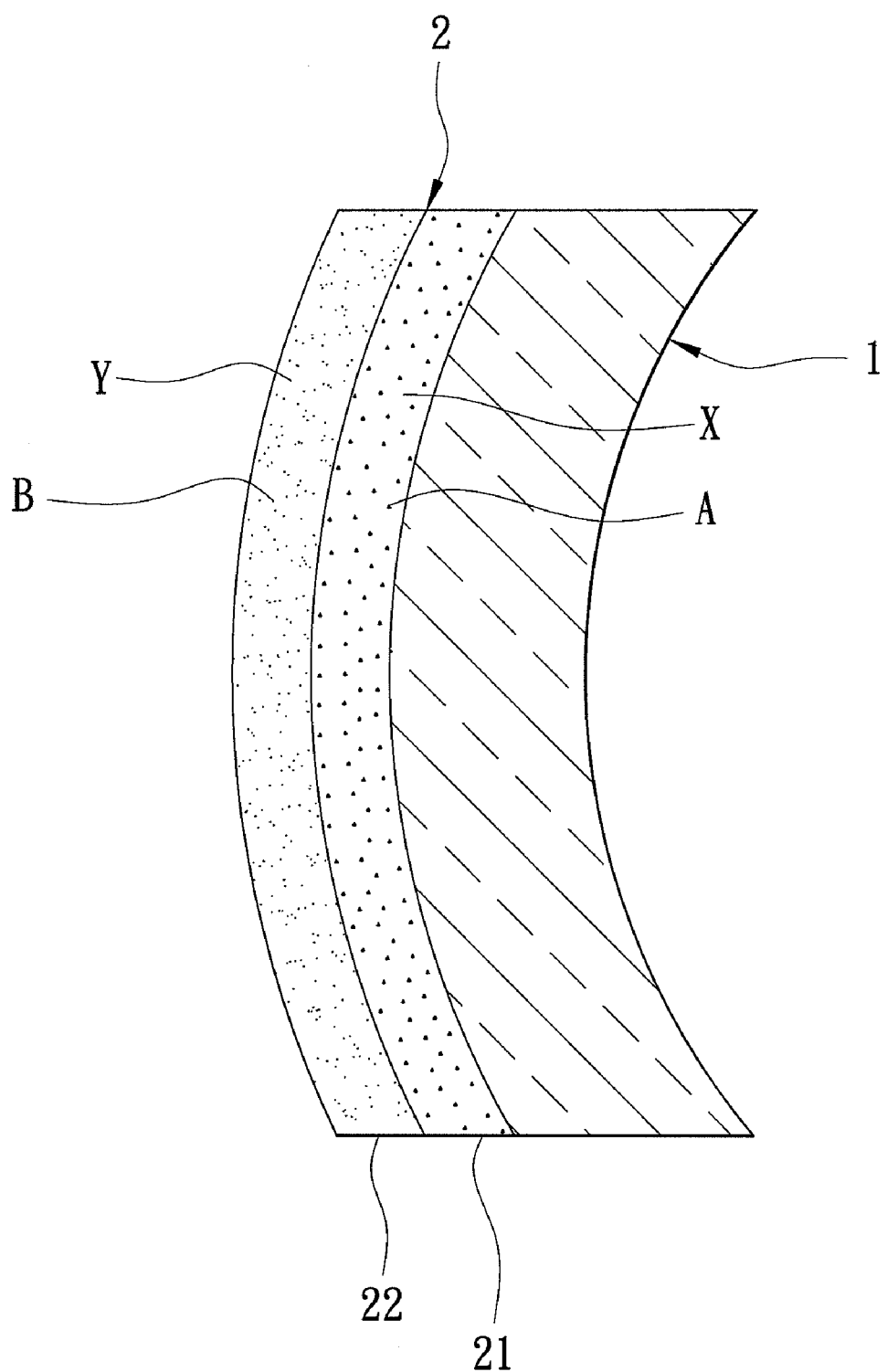
FIG. 3 is a sectional view of a photochromic optical article according to the first preferred embodiment of the present invention.

Referring to FIG. 3, a photochromic optical article according to the first preferred embodiment of the present invention is shown to comprise a substrate 1 and a photochromic coating 2.

The substrate 1 is a transparent or semi-transparent optical element, and may be made of a glass material, a ceramic material, or a plastic material, such as polycarbonate (PC), polymethylmethacrylate (PMMA), allyl diglycol carbonate resin (MasterCast 1 or MasterCast 2, or CR-39), polyethylene terephthalate (PET), polyvinyl alcohol (PVA), nylon, etc. However, the material of the substrate 1 is not limited to the aforesaid disclosures.

The photochromic coating 2 is coated on an outer surface of the substrate 1, and has two photochromic layers 21, 22. Each of the photochromic layers 21, 22 has a composition that contains a carrier (X, Y) and a photochromic dye (A, B). The compositions of the photochromic layers 21, 22, in this embodiment, are different from each other, i.e., the carrier (X) and the photochromic dye (A) of the photochromic layer 21 are different from the carrier (Y) and the photochromic dye (B) of the photochromic layer 22. The photochromic layer 21 is formed by mixing the photochromic dye (A) and the carrier (X). The photochromic layer 22 is formed by mixing the photochromic dye (B) and the carrier (Y). The photochromic coating 2 is not limited to being coated on a single surface of the substrate 1, and may be coated on both surfaces or one or more parts of one or both surfaces of the substrate 1 as required.

The carrier (X, Y) of each photochromic layer 21, 22 is made of a polymeric material selected from the group consisting of polyurethane-based polymer, polyurea urethane-based polymer, poly (meth) acrylic-based polymer, aminoplast, epoxy-based polymer, ethyleneglycol bismethacrylate polymer, ethoxylated phenol bismethacrylate polymer, urethane acrylate polymer, polythiourethane polymer, cellulose acetate butyrate (CAB), polystyrene, and styrene-methyl methacrylate copolymer.

The present invention is aimed at selecting suitable carriers for different photochromic dyes. In this embodiment, the photochromic dye (A) is mixed with the carrier (X), and the photochromic dye (B) is mixed with the carrier (Y). The carrier (X) is then coated onto the substrate 1 by a coating process, and is then cured to form the photochromic layer 21. Afterwards, the carrier (Y) is coated on the photochromic layer 21 by a coating process, and is then cured to form the photochromic layer 22.

The mixing of the photochromic dyes (A, B) with the respective carriers (X, Y) is carried out through a conventional method, such as direct mixing without using any solvent, or using a solvent as a mixing medium. However, the mixing is not limited only to such methods. The coating process may be any one of the following conventional coating processes: dip coating, spin coating, flow coating, spray coating, etc.

Further, according to the present invention, the color and the activated color intensity required by the photochromic optical article can be achieved by adjusting the thickness of the photochromic layers 21, 22 or the weight ratio of the photochromic dye (A, B) to the carrier (X, Y) of each photochromic layer 21, 22.

It is worth mentioning that each photochromic layer 21, 22 may include more than one kind of photochromic dye, and that the kind of the photochromic dye (A) used in the photochromic layer 21 may be different from the kind of the photochromic dye (B) used in the photochromic layer 22. Further, the number of the photochromic dyes (A, B) need not correspond exactly to the number of the photochromic layers 21, 22. That is, more than one kind of photochromic dye may be present in a single photochromic layer. The number of the photochromic layers required and the number of the photochromic dyes to be added to each photochromic layer are determined according to the color change requirement of the photochromic optical article and the characteristics of the photochromic dye.

Moreover, in the present invention, a primer (not shown) may be coated between the photochromic layers 21, 22 or between the photochromic layer 21 and the substrate 1 as required so as to improve surface characteristics therebetween (such as the adhesion force therebetween). Also, a protective layer may be added to an outer surface of the photochromic layer 22 as required so as to isolate the photochromic layer 22 from the outside environment, so that the photochromic properties of the present invention are not affected by exposure to the outside environment. If necessary, other coatings, such as a hard coating, a tint coating, an anti-reflection coating, an anti-fog coating, waterproof coating, an anti-static coating, and an anti-radiation coating may be added to the outer surface of the photochromic layer 22.

Figure 2:
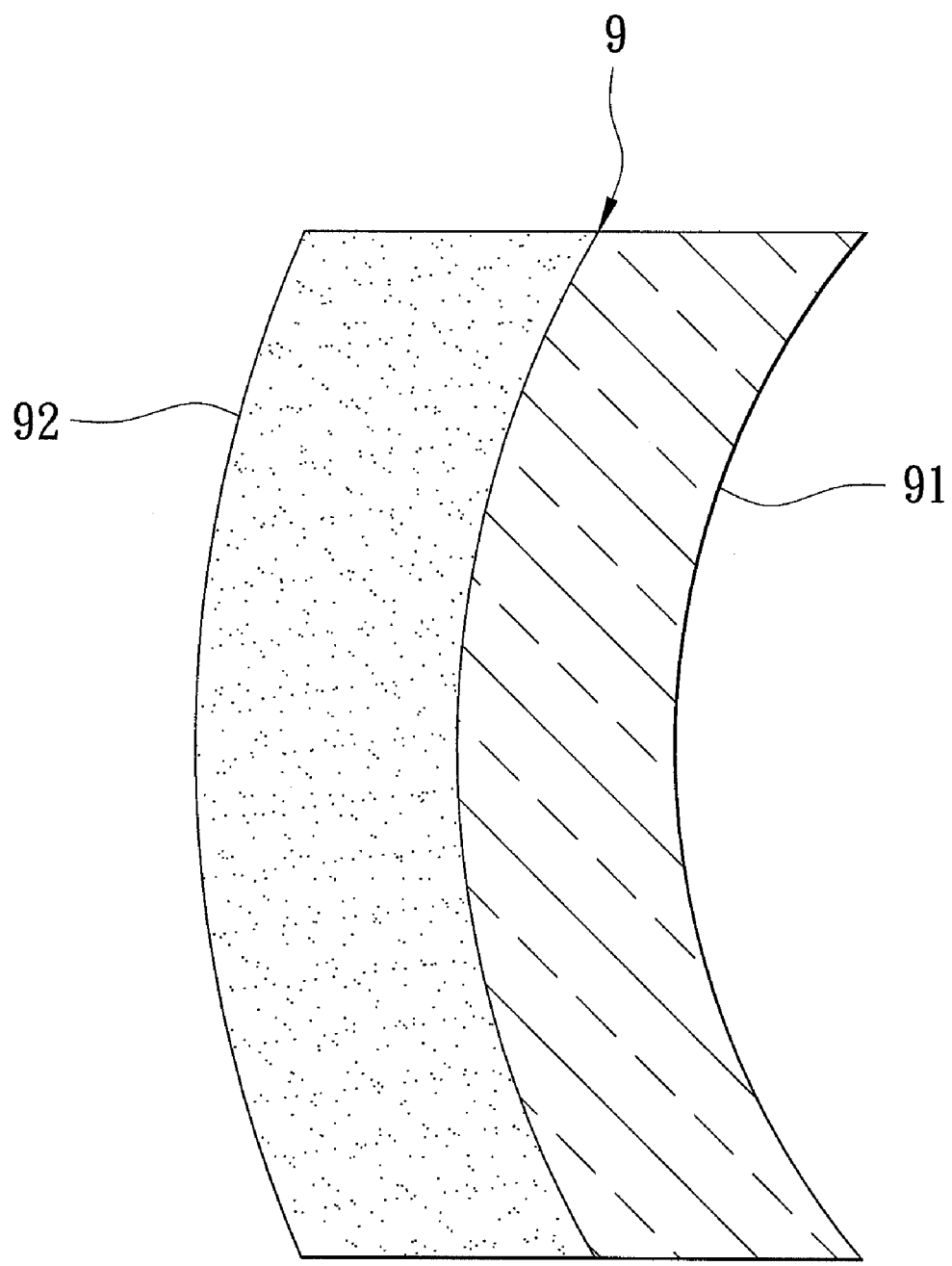
FIG. 2 is a sectional view of another conventional photochromic optical article.
Figure 4:
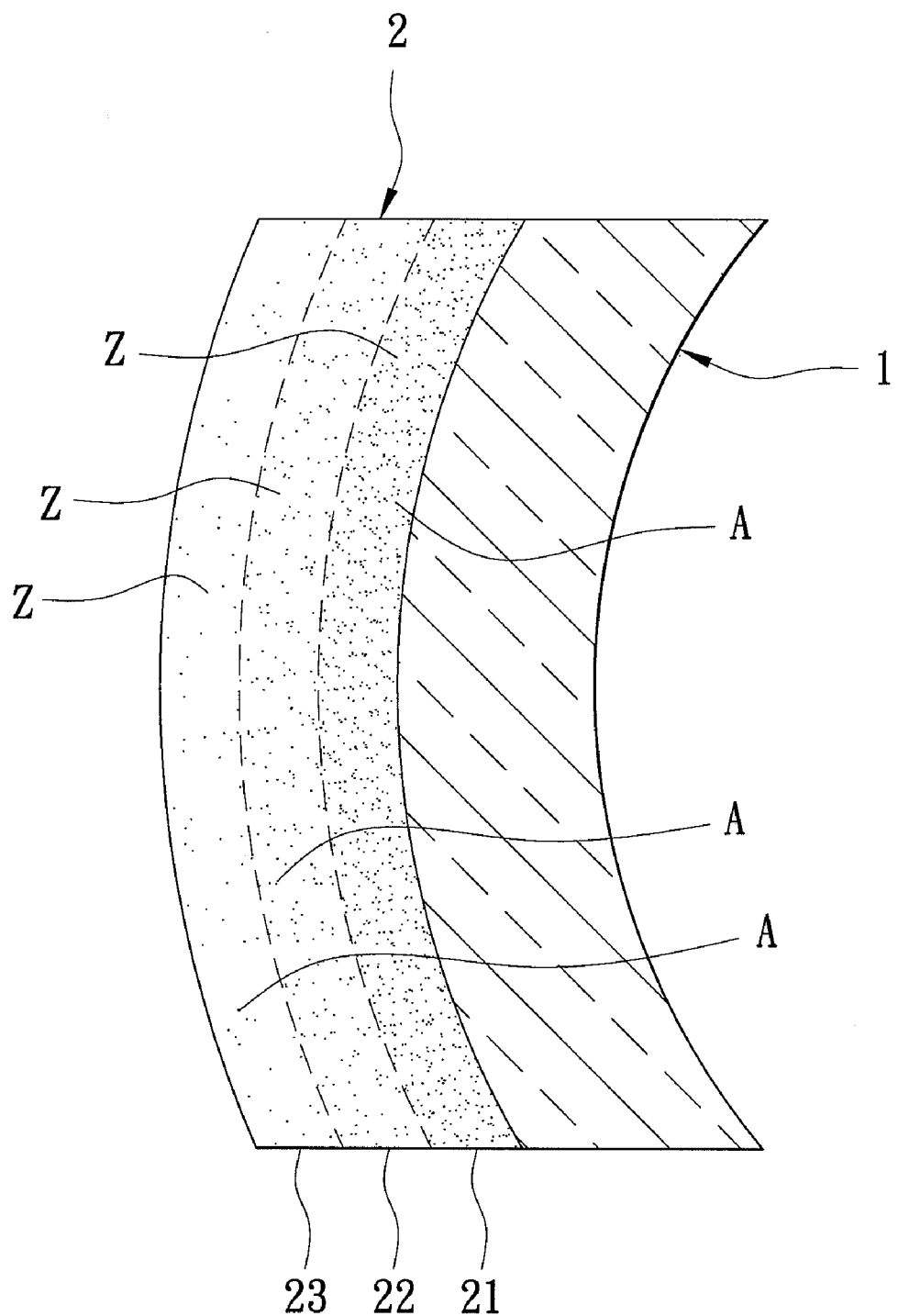
FIG. 4 is a sectional view of a photochromic optical article according to the second preferred embodiment of the present invention, wherein three photochromic layers have different compositions.

Referring to FIG. 4, there is shown a photochromic optical article according to the second preferred embodiment of the present invention which differs from the first preferred embodiment in that the photochromic coating 2 has three photochromic layers 21, 22, 23. The photochromic layers 21, 22, 23 have the same photochromic dye (A) and the same carrier (Z). However, the compositions for the photochromic layers 21, 22, 23 are different in weight ratio of the photochromic dye (A) to the carrier (Z). The weight ratio of the photochromic dye (A) to the carrier (Z) decreases from an innermost photochromic layer 21 that is nearest to the outer surface of the substrate 1 to an outermost photochromic layer 23 that is farthest from the outer surface of the substrate 1. The thickness of each photochromic layer 21, 22, 23 is about one-third of that of the conventional photochromic layer 92 shown in FIG. 2.

Figure 5:
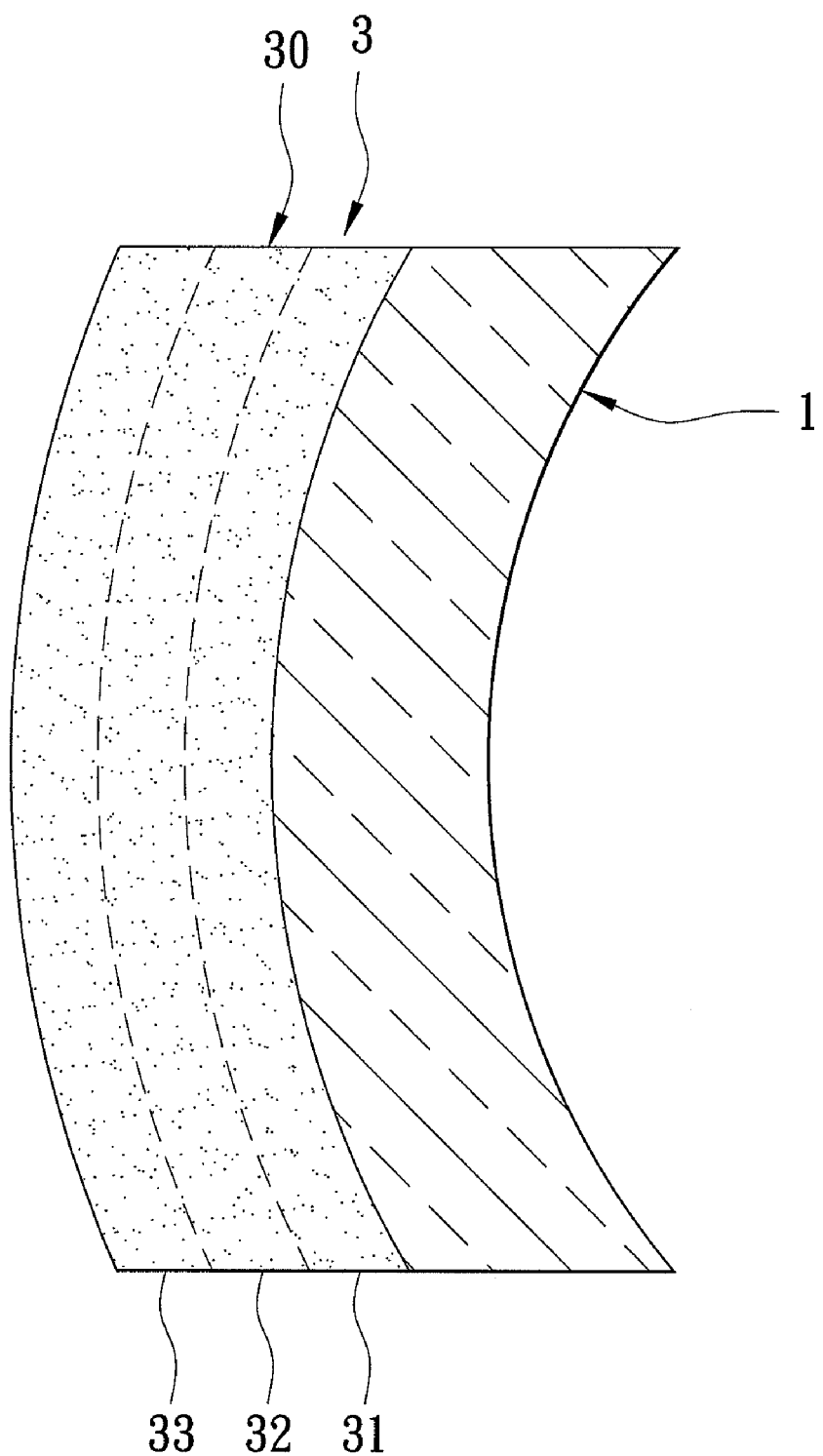
FIG. 5 is a view similar to FIG. 4, but illustrating a photochromic coating having the same composition for three photochromic layers.

Referring to FIG. 5, if a photochromic optical article 3 includes three photochromic layers 31, 32, 33 which have the same photochromic dye and the same carrier as the photochromic layers 21, 22, 23 shown in FIG. 4, but are provided with the same weight ratio of the photochromic dye to the carrier, the following problems will arise:

When the photochromic optical article 3 is irradiated by ultraviolet (UV) light, the UV light rays first pass through the outermost photochromic layer 33 so that it changes color. Since the remaining UV light rays then pass consecutively through the photochromic layers 32, 31, the photochromic layer 31 receives the smallest amount of UV light rays. In this situation, because the same weight ratio of the photochromic dye to the carrier is used in each photochromic layer 31, 32, 33, the amount of the photochromic dye activated by the UV light is the smallest in the photochromic layer 31 so that the activated color intensity thereof cannot be as good as that of the photochromic layer 33.

In case the weight ratio of the photochromic dye to the carrier is increased in order to increase the activated color intensity as in the prior art, this will help only to a certain point, past which further increases in the weight ratio will result in waste of the photochromic dye (C). Similarly, if the thickness of the photochromic coating 30 or the photochromic layer 31 is increased as in the prior art, this will result in waste of the coating liquid after the thickness reaches a certain high level. This is why in the prior art shown in FIG. 2, the activated color cannot be intensified or the color cannot be easily changed.

Referring back to FIG. 4, in the present invention, in order to effectively increase the activated color intensity, the weight ratio of the photochromic dye (A) to the carrier (Z) is decreased as the distance from the outer surface of the substrate 1 is increased, so that the photochromic dye (A) in the photochromic layers 21, 22, 23 can be fully utilized and will not be wasted. Since varying the weight ratio of the photochromic dye to the carrier is difficult for a single layer photochromic coating, the present invention employs a multi-layered structure for the photochromic coating 2 including the photochromic layers 21, 22, 23 to achieve this purpose. The weight ratios of the photochromic dye (A) to the carrier (Z) in the photochromic layers 21, 22, 23 are sequentially reduced from the innermost photochromic layer 21 to the outermost photochromic layer 23 in order to thereby increase the activated color intensity of the photochromic coating 2. Therefore, even if the total amount of the photochromic dye (A) used in the present invention is similar to that of the photochromic dye in the photochromic layer 92 shown in FIG. 2, a higher activated color intensity can be achieved in the present invention.

While three photochromic layers are used in this embodiment, the present invention is not limited only thereto. Two or more photochromic layers may be employed according to the present invention. Further, each photochromic layer may have one or more kinds of photochromic dyes. The thicknesses of the photochromic layers may also differ. Further, as long as the photochromic dyes in the layers can be fully activated and utilized, the photochromic layers should not be limited to the same carrier.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

We claim:
1. A photochromic optical article comprising:
    a substrate; and
    a photochromic coating coated on an outer surface of the substrate and having at least two photochromic layers, each of the photochromic layers having a composition that contains a carrier and at least one photochromic dye, the compositions of the photochromic layers being different from each other;
    wherein the photochromic dyes of the photochromic layers are the same, the carriers of the photochromic layers being the same, the compositions for the photochromic layers being different in weight ratio of the photochromic dye to the carrier;
    wherein the weight ratio of the photochromic dye to the carrier decreases from an innermost one of the photochromic layers that is nearest to the outer surface of the substrate to an outermost one of the photochromic layers that is farthest from the outer surface of the substrate.

2. The photochromic optical article of claim 1, wherein the substrate is made of a material selected from the group consisting of glass, ceramics, and plastic.

3. The photochromic optical article of claim 1, wherein the substrate is made of a material selected from the group consisting of polycarbonate (PC), polymethyl methacrylate (PMMA), allyl diglycol carbonate resin, polyethylene terephthalate (PET), polyvinyl alcohol (PVA), and nylon.

4. The photochromic optical article of claim 1, wherein the carrier of each of the photochromic layers is made of a polymeric material selected from the group consisting of polyurethane-based polymer, polyurea urethane-based polymer, poly(meth)acrylic-based polymer, aminoplast, epoxy-based polymer, ethyleneglycol bismethacrylate polymer, ethoxylated phenol bismethacrylate polymer, urethane acrylate polymer, polythiourethane polymer, cellulose acetate butyrate (CAB), styrene polymer, and styrene-methyl methacrylate copolymer.

* * * * *